J. J. BAUSCH.
REINFORCED EYEPIECE CAP AND SIMILAR ARTICLE.
APPLICATION FILED NOV. 21, 1917.
1,270,772.
Patented July 2, 1918.
Fig-1-
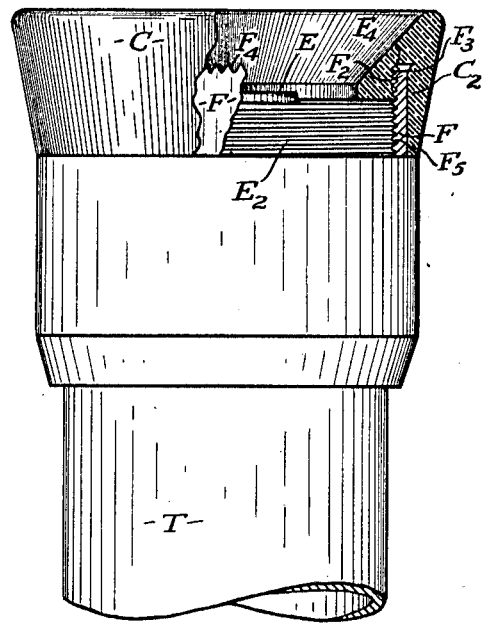
Fig-2-
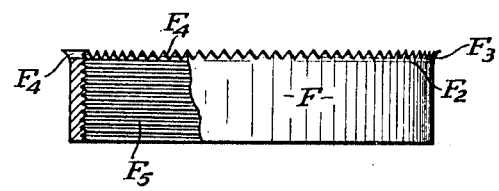
INVENTOR
John J. Bausch.
BY
his ATTORNEYS

UNITED STATES PATENT OFFICE.

JOHN J. BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

REINFORCED EYEPIECE-CAP AND SIMILAR ARTICLE.

1,270,772.  Specification of Letters Patent.  Patented July 2, 1918.

Original application filed January 25, 1917, Serial No. 144,362. Divided and this application filed November 21, 1917. Serial No. 203,220.

*To all whom it may concern:*

Be it known that I, JOHN J. BAUSCH, a citizen of the United States, residing at Rochester, in the county of Monroe, State of New York, have invented certain new and useful Improvements in Reinforced Eyepiece-Caps and Similar Articles; and I do hereby declare the following to be a full, clear, and exact description of the same, reference being had to the accompanying drawings, forming a part of this specification, and to the reference characters marked thereon.

This invention relates to eye piece caps and other annular or tubular walled articles, the main body portions of which are composed of material of relatively low intrinsic strength and having a rim for attaching the cap or other article to its support or to another article, such as a telescope eye piece. One object of the invention is to provide a construction whereby a reinforced cap or other article having an improved attaching rim may be made lighter and stronger than has heretofore been possible with comparatively thin walls, thereby enhancing the neatness of appearance of the article without restricting the use of materials or processes ordinarily desired, and without materially increasing the cost of manufacture.

The present application is a division of my co-pending application for method of making eye piece caps, Serial No. 144,362, filed January 25, 1917.

Eye piece caps of high grade optical instruments, especially field glasses, are usually made of hard rubber because that material is comparatively light in weight, dark in color, non-corrosive and is not uncomfortable when placed against the observer's eyebrows or face. These caps are commonly of annular form and are usually provided with a screw threaded rim for attaching them to the eye piece of an optical instrument.

One disadvantage inherent in hard rubber eye piece caps as heretofore constructed is that if made substantial enough to be amply durable, they are bulky and heavy, and if made sufficiently thin to satisfy the requirements of lightness and neatness, they are fragile. Another disadvantage lay in the fact that the threading of the cap was often a source of dissatisfaction, since the threads were usually either too tight or too loose, were easily crossed or stripped, and often caused the splitting of the cap rim.

An eye piece cap constructed in accordance with this invention obviates these disadvantages by incorporating in its structure a reinforcing or attaching ferrule made of metal or other material, having the requisite intrinsic strength as set forth in the following description which explains the application of my invention to the manufacture of eye piece caps.

In the drawings wherein like reference characters throughout indicate the same parts:

Figure 1 is a portion of the ocular end of a telescope to which is attached an eye piece cap constructed in accordance with my invention, a part of the cap having been broken away to clearly disclose its interior structure.

Fig. 2 is a partly broken out sectional side view of the reinforcing and attaching ferrule of the cap.

Referring now to the specific embodiment of my invention illustrated in the drawings and to the specific application thereof shown: the eye piece cap C is adapted for attachment to the eye piece E, that is adjustably mounted on the ocular end T of a telescope. The eye piece reinforcing ferrule F is preferably made of brass or steel tubing, is flared and serrated at its outer end portion $F_2$, and is internally screw threaded at $F_5$ to fit the threads $E_2$ on the forward end of the eye piece E. The metallic ferrule F with its outwardly flared outer edge $F_3$, which is serrated or notched at $F_4$, and its internal thread $F_5$, is clearly shown in Fig. 2, and the manner of its engagement with the end threads $E_2$ of the eye piece is shown in Fig. 1.

The material of which the body portion $C_2$ of the eye piece cap is made, is applied around the ferrule F, or expressed in another way, the ferrule F is mostly embedded in the material of the cap body $C_2$, which is a rubber composition molded around and into intimate contact with the ferrule F, and forced in all of its edge serrations $F_4$, and into some of its threads $F_5$, at the outer portion of the ferrule, as clearly shown in the sectioned portion of the cap in Fig. 1, after which the rubber composition is vulcanized to hardness. The vulcanized rubber or vulcanite forming the body $C_2$ of the cap, and the ferrule F which reinforces the body of the cap and provides a screw threaded lining for the attaching rim of the cap, are thus united.

After those inner portions of the threads $F_5$, which provide the cap with an internally threaded attaching rim, have been cleaned out, the surplus material of the cap body $C_2$ is cut away by machining, preferably by turning, and the cap is thus reduced to the desired size and form. The internally threaded attaching rim of the cap facilitates chucking prior to turning the cap body $C_2$. After machining, the cap may be polished or otherwise finished.

If for any reason it is desired to cut the cap body $C_2$ out of the material of which it is to be made, as would be the case if a single cap were to be made of a block of fiber or a block of wood, then the threaded and serrated end $F_2$ of the ferrule F may be placed in an annular groove formed in the block of material and set therein with cement and after the cement has properly hardened thus embedding the ring in the cement which adheres to the block of material, the surplus material may be cut away, and the cap then may be polished or otherwise finished.

Whether made by molding or formed by cutting, but especially if made by molding which is obviously the preferable process, this improved cap may be very economically manufactured, and may be made with comparatively thin walls and thus it will be light in weight and will be so strong as to stand abuse without cracking, and even should the cap body $C_2$ crack, the ferrule F would prevent the cap from disintegrating, and a cap made in accordance with this invention also will be free from warping and may be finished in any way desired. When manufactured in quantities the caps are interchangeable and any cap may be applied to and removed from the eye piece E or other support as often as desired without injury to either the eye piece or its support.

The extrusion of the ferrule to laterally offset the serrations need not necessarily be outward in the form of a flare, it may be crimped inwardly instead to offset the serrations inward, and in some instances it may even be desirable neither to offset the serrations inwardly nor to offset them outwardly, and to depend upon the concentric screw threading of the embedded portion of the ferrule for a sufficient longitudinal anchorage. The disposition and offsetting of the serrations of the ferrule will of course, be governed usually by the nature and cross sectional contour, and by the relative dimensions of the article and the ferrule that is to be embedded. However, when it is desired to depend entirely upon the serrations for anchoring the ferrule, the lateral offsetting of the serrations or the serrated portion of the ferrule, is essential.

Having thus described my invention what I claim and desire to secure by Letters Patent of the United States is:

1. The combination with an article having a rim formed of material having relatively low intrinsic strength, of a reinforcing and attaching ferrule formed of material of relatively higher intrinsic strength and having a serrated end embedded and anchored in the article to form a part of the rim thereof.

2. The combination with an article including a rim formed of material having relatively low intrinsic strength and a support to which the article is to be attached, of a ferrule formed of material of relatively higher intrinsic strength embedded in and forming a part of the rim of the article, said ferrule being provided with an offset serrated portion for anchoring it within the article and means for securing it to the support.

3. The combination with an article including an annular rim formed of material having relatively low intrinsic strength and a support to which the article is to be attached, of a ring shaped ferrule formed of material of relatively higher intrinsic strength having a flared and serrated end embedded within the rim of the article and having an inner exposed portion provided with fastening means for attaching the article to its support.

4. The combination with an article having an annular rim formed of material having relatively low intrinsic strength, of a ring shaped ferrule formed of material of relatively higher intrinsic strength, flared and serrated at one end and screw threaded throughout its length, and embedded within the rim of the article with a portion of its screw thread exposed, whereby the article is reinforced and means is provided for attaching the article to the support.

5. The combination with a metallic reinforcing and attaching ferrule, of an outer body of material having relatively lower intrinsic strength molded while in a plastic state around the ferrule and subsequently solidified, the ferrule being provided with laterally extruded serrations intimately embedded within the plastic body material for anchoring it thereto, and having a threaded rim portion overlaid exteriorly by a portion of the outer body of plastic material.

6. The combination with an internally screw threaded metallic ring having a flared and serrated end, of an annular body of material of relatively lower intrinsic strength molded while in a plastic state about the ring and subsequently solidified, that portion of the ring adjacent to and including its flared and serrated end being intimately embedded within the body wall and the remaining portion of the ring lining the adjacent inner portion of the body wall, thereby reinforcing the body and providing it with a screw threaded attaching rim.

JOHN J. BAUSCH.

Copies of this patent may be obtained for five cents each, by addressing the "Commissioner of Patents, Washington, D. C."